United States Patent
Taylor et al.

(10) Patent No.: US 11,681,375 B1
(45) Date of Patent: Jun. 20, 2023

(54) NON-UNIFORM PRESSURE ACTUATION THRESHOLD VALUE

(71) Applicant: Cirque Corporation, Sandy, UT (US)

(72) Inventors: David Taylor, West Jordan, UT (US); Tyler Smith, American Fork, UT (US)

(73) Assignee: Cirque Corporation, Sandy, UT (US)

( * ) Notice: Subject to any disclaimer, the term of this patent is extended or adjusted under 35 U.S.C. 154(b) by 0 days.

(21) Appl. No.: 17/888,801

(22) Filed: Aug. 16, 2022

(51) Int. Cl.
*G06F 3/01* (2006.01)
*G06F 3/044* (2006.01)

(52) U.S. Cl.
CPC ............ *G06F 3/016* (2013.01); *G06F 3/0446* (2019.05); *G06F 3/0445* (2019.05); *G06F 2203/04105* (2013.01)

(58) Field of Classification Search
CPC ........... G06F 3/016; G06F 2203/04105; G06F 3/0445; G06F 3/04142; G06F 3/0444–0446
See application file for complete search history.

(56) References Cited

U.S. PATENT DOCUMENTS

| | | | |
|---|---|---|---|
| 10,031,583 B2 | 7/2018 | Levesque | |
| 10,359,848 B2 | 7/2019 | Winter | |
| 11,263,421 B2 * | 3/2022 | Liu | H03K 17/962 |
| 11,301,053 B2 | 4/2022 | Gajiwala | |
| 2011/0062971 A1 * | 3/2011 | Badaye | G06F 3/0443 324/686 |
| 2011/0248839 A1 * | 10/2011 | Kwok | G06F 3/016 345/173 |
| 2014/0028624 A1 | 1/2014 | Marsden | |
| 2016/0034057 A1 * | 2/2016 | Ikeda | G06F 3/041 345/173 |
| 2016/0088133 A1 * | 3/2016 | Kim | G06F 3/0416 345/174 |
| 2016/0328065 A1 * | 11/2016 | Johnson | G06F 3/044 |
| 2017/0139505 A1 * | 5/2017 | Shepelev | G06F 3/0446 |
| 2019/0391677 A1 | 12/2019 | Costante | |
| 2022/0291796 A1 * | 9/2022 | Lu | G06F 1/169 |

\* cited by examiner

*Primary Examiner* — Temesghen Ghebretinsae
*Assistant Examiner* — Ivelisse Martinez Quiles

(57) ABSTRACT

A capacitance sensing module may include a capacitance sensor; a pressure sensor in mechanical communication with the capacitance sensor; a processor and memory; programmed instructions stored in the memory to cause the processor, when executed, to determine, with the capacitance sensor, a location of a user input; determine, with the pressure sensor, a pressure value of the user input applied to the capacitance sensor; and determine whether the pressure value exceeds a non-uniform actuation threshold value where the non-uniform actuation threshold value is based, at least in part, on the location of the user input on the capacitance sensor.

18 Claims, 13 Drawing Sheets

NON-UNIFORM PRESSURE ACTUATION THRESHOLD VALUE

FIELD OF THE DISCLOSURE

This disclosure relates generally to systems and methods for determining whether a pressure threshold is exceeded in a capacitance sensing application. In particular, this disclosure relates to systems and methods for determining whether a pressure threshold is exceeded in a capacitance sensing application with a non-uniform pressure threshold actuation value.

BACKGROUND

A touch screen is often incorporated into electronic tablets and other devices to provide a mechanism for giving inputs to the device. The touch screens may operate using pressure sensing, which may directly manipulate objects depicted in the screen. Pressure sensors may detect pressure from on the touch screen intended by the user to be control inputs.

An example of a pressure sensor is disclosed in U.S. Pat. No. 10,296,091 issued to Robert W. Heubel, et al. This reference discloses a method of generating haptic effects includes detecting an input of pressure applied to a device using a gesture and determining a level associated with the gesture based on the pressure input, as well as determining a selection of an item at the level based on the gesture and a context associated with the item at the level, along with generating a contextual haptic effect comprising haptic parameter based on the context of the item at the level.

Another example of a pressure sensor is disclosed in U.S. Patent Publication No. 2014/0368454 issued to Regis Croisonnier, et al. This reference discloses a control method for a function of a touchpad utilizing a capture device includes measuring an analog threshold pressure value, and differentials thereof, and delivering event signals based upon the threshold pressure values and differentials thereof to execute a selected function. The capture device for remote, virtual on-screen data input by hand annotation includes at least three functional layers including a bottom rigid layer, a middle pressure sensor layer, a capacitive flexible sensor layer, and a top flexible panel layer. The bottom rigid layer has a surface that provides a mechanical support for writing. The middle pressure sensor layer is adapted to measuring a pressure array or map on the capture active area and to send data representing the measured pressure to a personal computer. The top flexible touch-sensitive passive LCD display layer includes an LCD surface by which whatever is written down on the LCD is impressed graphically due to its liquid crystal physical properties wherein applied pressure changes the crystal particles orientation and light properties, such that when a stylus presses against a writing surface thereof, it leaves a visible trace allowing the user to produce a drawing though no real ink has flown.

Another example of a pressure sensor is disclosed in U.S. Pat. No. 10,359,848 issued to Andrew E. Winter, et al. This reference discloses input device haptics and pressure sensing techniques. An input device includes an outer surface, a pressure sensor and haptic feedback mechanism, and a pressure sensing and haptic feedback module. The outer surface is configured to receive an application of pressure by an object. The pressure sensor and haptic feedback mechanism has one or more piezos configured to detect and quantify an amount of the application of the pressure to the outer surface by the object, the one or more piezos configured to output a signal indicating the quantified amount of the pressure. The pressure sensing and haptic feedback module is configured to receive the signal from the one or more piezos indicating the quantified amount of the pressure and control the haptic feedback of the pressure sensor and haptic feedback mechanism.

Another example of a pressure sensor is disclosed in U.S. Patent Publication No. 2014/0028624 issued to Randal J. Marsden, et al. This reference discloses systems and methods that allow the user to rest their fingers on a touch-sensitive surface and make selections on that surface with a pressing action. Touch capacitance sensors that typically provide X and Y location data associated with a user's touch are also used to discern finger pressure in the Z direction. This allows the user to make an actuation on the touch screen by simply pressing harder at a location where they may already be resting their finger(s).

Each of these references are herein incorporated by reference for all that they disclose.

SUMMARY

In one embodiment, a capacitance sensing module may include a capacitance sensor; a pressure sensor in mechanical communication with the capacitance sensor; a processor and memory; programmed instructions stored in the memory to cause the processor, when executed, to determine, with the capacitance sensor, a location of a user input; determine, with the pressure sensor, a pressure value of the user input applied to the capacitance sensor; and determine whether the pressure value exceeds a non-uniform actuation threshold value where the non-uniform actuation threshold value is based, at least in part, on the location of the user input on the capacitance sensor.

The programmed instructions may cause the processor, when executed, to trigger a haptic response when the non-uniform actuation threshold is exceeded.

The non-uniform actuation threshold value may get progressively lower the farther away the user input is away from the pressure sensor.

The pressure sensor may be a piezoelectric device.

The piezoelectric device may be configured to apply a haptic response to the capacitance sensor in response to a user input exceeding the non-uniform actuation threshold value.

The programmed instructions may cause the processor, when executed to assign a first region of the capacitance sensor a first non-uniform actuation threshold value; and assign a second region of the capacitance sensor a second non-uniform actuation threshold value where the second region is farther away from the pressure sensor than the first region where the first non-uniform actuation threshold value is higher than the second non-uniform actuation threshold value.

The module may further include a second pressure sensor in mechanical communication with the capacitance sensor where the non-uniform actuation threshold value of the user input is based, at least in part, on a first distance between the user input and the first pressure sensor; and where the non-uniform actuation threshold value of the user input is also based, at least in part, on a second distance between the user input and the second pressure sensor.

The pressure sensor may be one of multiple pressure sensors and at least one pressure sensor may be located in each corner of the capacitance sensor where the non-uniform actuation threshold value of the user input is based, at least in part, on the distances of each of the pressure sensors located in each of the corners.

In one embodiment, a computing device may include a capacitance reference surface; a capacitance sensor in mechanical communication with the capacitance reference surface; a pressure sensor in mechanical communication with the capacitance sensor; a processor and memory; programmed instructions stored in the memory to cause the processor, when executed, to determine, with the capacitance sensor, a location of a user input; determine, with the pressure sensor, a pressure value of the user input applied to the capacitance sensor; and determine whether the pressure value exceeds a non-uniform actuation threshold value where the non-uniform actuation threshold value is based, at least in part, on the location of the user input on the capacitance sensor.

The capacitance reference surface may be part of a laptop housing.

The capacitance reference surface may be a touchpad overlay.

The capacitance reference surface may be a touch screen.

The capacitance reference surface may be a control button.

The programmed instructions may cause the processor, when executed, to trigger a haptic response when the non-uniform actuation threshold is exceeded.

The non-uniform actuation threshold value may get progressively lower the farther away the user input is away from the pressure sensor.

The pressure sensor may be a piezoelectric device where the piezoelectric device is configured to apply a haptic response to the capacitance sensor in response to a user input exceeding the non-uniform actuation threshold value.

The programmed instructions may cause the processor, when executed to assign a first region of the capacitance sensor a first non-uniform actuation threshold value; assign a second region of the capacitance sensor a second non-uniform actuation threshold value where the second region is farther away from the pressure sensor than the first region; where the first non-uniform actuation threshold value is higher than the second non-uniform actuation threshold value.

The module may further include a second pressure sensor in mechanical communication with the capacitance sensor; where the non-uniform actuation threshold value of the user input is based, at least in part, on a first distance between the user input and the first pressure sensor; and where the non-uniform actuation threshold value of the user input is also based, at least in part, on a second distance between the user input and the second pressure sensor.

The pressure sensor may be one of multiple pressure sensors and at least one pressure sensor is located in each corner of the capacitance sensor where the non-uniform actuation threshold value of the user input is based, at least in part, on the distances of each of the pressure sensors located in each of the corners.

In one embodiment, a computer-program product of using a capacitance sensor module, may include a non-transitory computer-readable medium storing instructions executable by a processor to determine, with a capacitance sensor, a location of a user input on a capacitance reference surface in mechanical communication with the capacitance sensor; determine, with a pressure sensor in communication with the capacitance sensor, a pressure value of the user input applied to the capacitance sensor; and determine whether the pressure value exceeds a non-uniform actuation threshold value where the non-uniform actuation threshold value is based, at least in part, on the location of the user input on the capacitance sensor.

Figure 1:
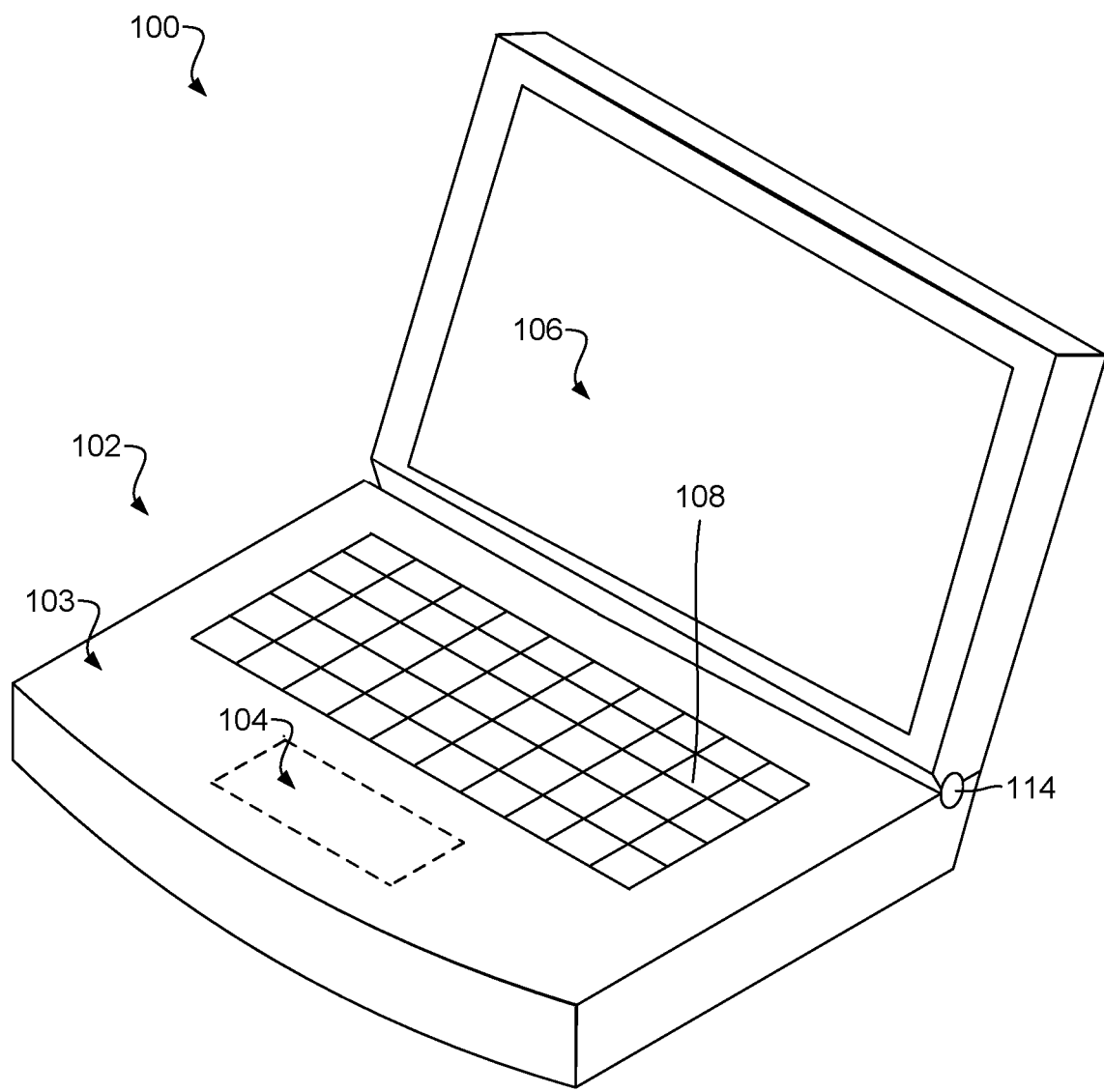
FIG. 1 depicts an example of an electronic device in accordance with the disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION OF THE INVENTION

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "aligned" generally refers to being parallel, substantially parallel, or forming an angle of less than 35.0 degrees. For purposes of this disclosure, the term "transverse" generally refers to perpendicular, substantially perpendicular, or forming an angle between 55.0 and 125.0 degrees. For purposes of this disclosure, the term "length" generally refers to the longest dimension of an object. For purposes of this disclosure, the term "width" generally refers to the dimension of an object from side to side and may refer to measuring across an object perpendicular to the object's length.

For purposes of this disclosure, the term "electrode" may generally refer to a portion of an electrical conductor intended to be used to make a measurement, and the terms "route" and "trace" generally refer to portions of an electrical conductor that are not intended to make a measurement. For purposes of this disclosure in reference to circuits, the term "line" generally refers to the combination of an electrode and a "route" or "trace" portions of the electrical conductor. For purposes of this disclosure, the term "Tx" generally refers to a transmit line, electrode, or portions thereof, and the term "Rx" generally refers to a sense line, electrode, or portions thereof.

For the purposes of this disclosure, the term "electronic device" may generally refer to devices that can be transported and include a battery and electronic components. Examples may include a laptop, a desktop, a mobile phone, an electronic tablet, a personal digital device, a watch, a gaming controller, a gaming wearable device, a wearable device, a measurement device, an automation device, a security device, a display, a vehicle, an infotainment system, an audio system, a control panel, another type of device, an athletic tracking device, a tracking device, a card reader, a purchasing station, a kiosk, or combinations thereof.

It should be understood that use of the terms "capacitance module," "touch pad" and "touch sensor" throughout this document may be used interchangeably with "capacitive touch sensor," "capacitive sensor," "capacitance sensor," "capacitive touch and proximity sensor," "proximity sensor," "touch and proximity sensor," "touch panel," "trackpad," "touch pad," and "touch screen."

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

In some cases, the capacitance module is located within a housing. The capacitance module may be underneath the housing and capable of detecting objects outside of the housing. In examples, where the capacitance module can detect changes in capacitance through a housing, the housing is a capacitance reference surface. For example, the capacitance module may be disclosed within a cavity formed by a keyboard housing of a computer, such as a laptop or other type of computing device, and the sensor may be disposed underneath a surface of the keyboard housing. In such an example, the keyboard housing adjacent to the capacitance module is the capacitance reference surface. In some examples, an opening may be formed in the housing, and an overlay may be positioned within the opening. In this example, the overlay is the capacitance reference surface. In such an example, the capacitance module may be positioned adjacent to a backside of the overlay, and the capacitance module may sense the presence of the object through the thickness of the overlay. For the purposes of this disclosure, the term "reference surface" may generally refer to a surface through which a pressure sensor, a capacitance sensor, or another type of sensor is positioned to sense a pressure, a presence, a position, a touch, a proximity, a capacitance, a magnetic property, an electric property, another type of property, or another characteristic, or combinations thereof that indicates an input. For example, the reference surface may be a housing, an overlay, or another type of surface through which the input is sensed. In some examples, the reference surface has no moving parts. In some examples, the reference surface may be made of any appropriate type of material, including, but not limited to, plastics, glass, a dielectric material, a metal, another type of material, or combinations thereof.

For the purposes of this disclosure, the term "display" may generally refer to a display or screen that is not depicted in the same area as the capacitive reference surface. In some cases, the display is incorporated into a laptop where a keyboard is located between the display and the capacitive reference surface. In some examples where the capacitive reference surface is incorporated into a laptop, the capacitive reference surface may be part of a touch pad. Pressure sensors may be integrated into the stack making up the capacitance module. However, in some cases, the pressure sensors may be located at another part of the laptop, such as under the keyboard housing, but outside of the area used to sense touch inputs, on the side of the laptop, above the keyboard, to the side of the keyboard, at another location on the laptop, or at another location. In examples where these principles are integrated into a laptop, the display may be pivotally connected to the keyboard housing. The display may be a digital screen, a touch screen, another type of screen, or combinations thereof. In some cases, the display is located on the same device as the capacitive reference surface, and in other examples, the display is located on another device that is different from the device on which the capacitive reference surface is located. For example, the display may be projected onto a different surface, such as a wall or projector screen. In some examples, the reference surface may be located on an input or gaming controller, and the display is located on a wearable device, such as a virtual reality or augmented reality screen. In some cases, the reference surface and the display are located on the same surface, but on separate locations on that surface. In other examples, the reference surface and the display may be integrated into the same device, but on different surfaces. In some cases, the reference surface and the display may be oriented at different angular orientations with respect to each other.

FIG. 1 depicts an example of an electronic device 100. In this example, the electronic device is a laptop. In the illustrated example, the electronic device 100 includes input components, such as a keyboard 102 and a capacitive module, such as a touch pad 104, that are incorporated into a housing 103. The electronic device 100 also includes a display 106. A program operated by the electronic device 100 may be depicted in the display 106 and controlled by a sequence of instructions that are provided by the user through the keyboard 102 and/or through the touch pad 104. An internal battery (not shown) may be used to power the operations of the electronic device 100.

The keyboard 102 includes an arrangement of keys 108 that can be individually selected when a user presses on a key with a sufficient force to cause the key 108 to be depressed towards a switch located underneath the keyboard 102. In response to selecting a key 108, a program may receive instructions on how to operate, such as a word processing program determining which types of words to process. A user may use the touch pad 104 to give different types of instructions to the programs operating on the computing device 100. For example, a cursor depicted in the display 106 may be controlled through the touch pad 104. A user may control the location of the cursor by sliding his or her hand along the surface of the touch pad 104. In some cases, the user may move the cursor to be located at or near an object in the computing device's display and give a command through the touch pad 104 to select that object. For example, the user may provide instructions to select the object by tapping the surface of the touch pad 104 one or more times.

The touch pad 104 is a capacitance module that includes a stack of layers disposed underneath the keyboard housing, underneath an overlay that is fitted into an opening of the keyboard housing, or underneath another capacitive reference surface. In some examples, the capacitance module is located in an area of the keyboard's surface where the user's palms may rest while typing. The capacitance module may include a substrate, such as a printed circuit board or another type of substrate. One of the layers of the capacitance module may include a sensor layer that includes a first set of electrodes oriented in a first direction and a second layer of electrodes oriented in a second direction that is transverse the first direction. These electrodes may be spaced apart and/or electrically isolated from each other. The electrical isolation may be accomplished by deposited at least a portion of the electrodes on different sides of the same substrate or providing dedicated substrates for each set of electrodes. Capacitance may be measured at the overlapping intersections between the different sets of electrodes. However, as an object with a different dielectric value than the surrounding air (e.g., finger, stylus, etc.) approach the intersections between the electrodes, the capacitance between the electrodes may change. This change in capacitance and the associated location of the object in relation to the capacitance module may be calculated to determine where the user is touching or hovering the object within the detection range of the capacitance module. In some examples, the first set of electrodes and the second set of electrodes are equidistantly spaced with respect to each other. Thus, in these examples, the sensitivity of the capacitance module is the same in both directions. However, in other examples, the distance between the electrodes may be non-uniformly spaced to provide greater sensitivity for movements in certain directions.

In some cases, the display 106 is mechanically separate and movable with respect to the keyboard with a connection mechanism 114. In these examples, the display 106 and keyboard 102 may be connected and movable with respect to one another. The display 106 may be movable within a range of 0 degrees to 180 degrees or more with respect to the keyboard 102. In some examples, the display 106 may fold over onto the upper surface of the keyboard 102 when in a closed position, and the display 106 may be folded away from the keyboard 102 when the display 106 is in an operating position. In some examples, the display 106 may be orientable with respect to the keyboard 102 at an angle between 35 to 135 degrees when in use by the user. However, in these examples, the display 106 may be positionable at any angle desired by the user.

In some examples, the display 106 may be a non-touch sensitive display. However, in other examples at least a portion of the display 106 is touch sensitive. In these examples, the touch sensitive display may also include a capacitance module that is located behind an outside surface of the display 106. As a user's finger or other object approaches the touch sensitive screen, the capacitance module may detect a change in capacitance as an input from the user.

While the example of FIG. 1 depicts an example of the electronic device being a laptop, the capacitance sensor and touch surface may be incorporated into any appropriate device. A non-exhaustive list of devices includes, but is not limited to, a desktop, a display, a screen, a kiosk, a computing device, an electronic tablet, a smart phone, a location sensor, a card reading sensor, another type of electronic device, another type of device, or combinations thereof.

Figure 2:
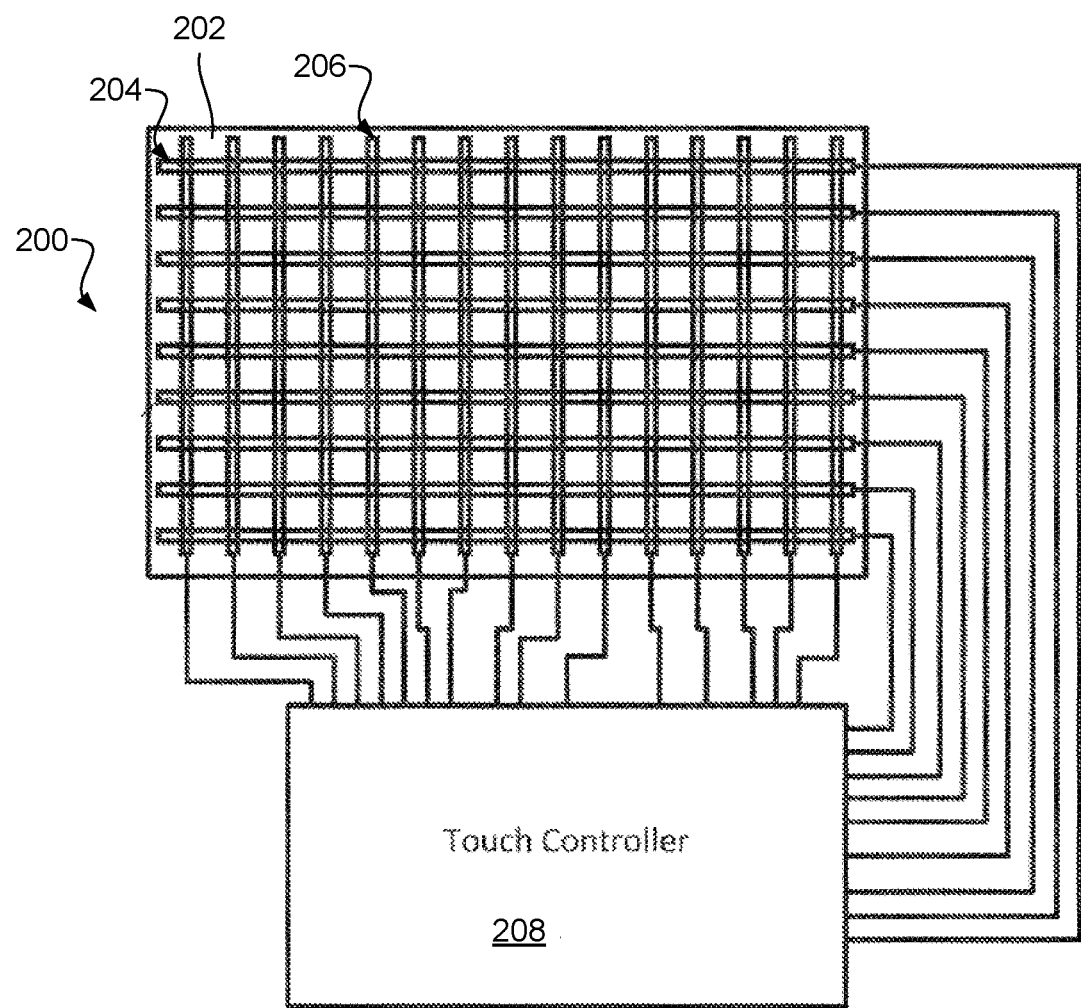
FIG. 2 depicts an example of a substrate with a first set of electrodes and a second set of electrodes in accordance with the disclosure.

FIG. 2 depicts an example of a portion of a capacitance module 200. In this example, the capacitance module 200 may include a substrate 202, first set 204 of electrodes, and a second set 206 of electrodes. The first and second sets 204, 206 of electrodes may be oriented to be transverse to each other. Further, the first and second sets 204, 206 of electrodes may be electrically isolated from one another so that the electrodes do not short to each other. However, where electrodes from the first set 204 overlap with electrodes from the second set 206, capacitance can be measured. The capacitance module 200 may include one or more electrodes in the first set 204 or the second set 206. Such a substrate 202 and electrode sets may be incorporated into a touch screen, a touch pad, a location sensor, a gaming controller, a button, and/or detection circuitry.

In some examples, the capacitance module 200 is a mutual capacitance sensing device. In such an example, the substrate 202 has a set 204 of row electrodes and a set 206 of column electrodes that define the touch/proximity-sensitive area of the component. In some cases, the component is configured as a rectangular grid of an appropriate number of electrodes (e.g., 8-by-6, 16-by-12, 9-by-15, or the like).

As shown in FIG. 2, the capacitance module 208 includes a capacitance controller 208. The capacitance controller 208 may include at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical design components, or combinations thereof, with appropriate circuitry, hardware, firmware, and/or software to choose from available modes of operation.

In some cases, the capacitance controller 208 includes at least one multiplexing circuit to alternate which of the sets 204, 206 of electrodes are operating as drive electrodes and sense electrodes. The driving electrodes can be driven one at a time in sequence, or randomly, or drive multiple electrodes at the same time in encoded patterns. Other configurations are possible such as a self-capacitance mode where the electrodes are driven and sensed simultaneously. Electrodes may also be arranged in non-rectangular arrays, such as radial patterns, linear strings, or the like. A shield layer (see FIG. 3) may be provided beneath the electrodes to reduce noise or other interference. The shield may extend beyond the grid of electrodes. Other configurations are also possible.

In some cases, no fixed reference point is used for measurements. The touch controller 208 may generate signals that are sent directly to the first or second sets 204, 206 of electrodes in various patterns.

In some cases, the component does not depend upon an absolute capacitive measurement to determine the location of a finger (or stylus, pointer, or other object) on a surface of the capacitance module 200. The capacitance module 200 may measure an imbalance in electrical charge to the electrode functioning as a sense electrode which can, in some examples, be any of the electrodes designated in either set 204, 206 or, in other examples, with dedicated-sense electrodes. When no pointing object is on or near the capacitance module 200, the capacitance controller 208 may be in a balanced state, and there is no signal on the sense electrode. When a finger or other pointing object creates imbalance because of capacitive coupling, a change in capacitance may occur at the intersections between the sets of electrodes 204, 206 that make up the touch/proximity sensitive area. In some cases, the change in capacitance is measured. However, in alternative example, the absolute capacitance value may be measured.

While this example has been described with the capacitance module 200 having the flexibility of the switching the sets 204, 206 of electrodes between sense and transmit electrodes, in other examples, each set of electrodes is dedicated to either a transmit function or a sense function.

Figure 3:
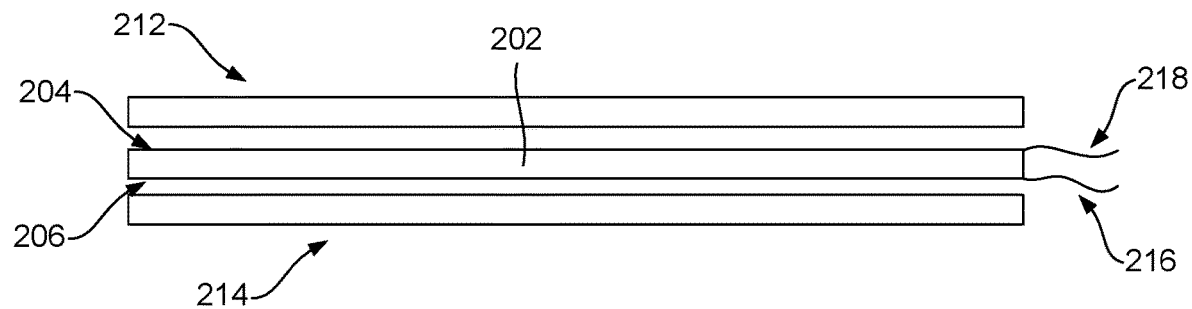
FIG. 3 depicts an example of a touch pad in accordance with the disclosure.

104 FIG. 3 depicts an example of a substrate 202 with a first set 204 of electrodes and a second set 206 of electrodes deposited on the substrate 202 that is incorporated into a capacitance module. The first set 204 of electrodes and the second set 206 of electrodes may be spaced apart from each other and electrically isolated from each other. In the example depicted in FIG. 3, the first set 204 of electrodes is deposited on a first side of the substrate 202, and the second set 206 of electrodes is deposited on the second side of the substrate 202, where the second side is opposite the first side and spaced apart by the thickness of the substrate 202. The substrate may be made of an electrically insulating material thereby preventing the first and second sets 204, 206 of electrodes from shorting to each other. As depicted in FIG. 2, the first set 204 of electrodes and the second set 206 of electrodes may be oriented transversely to one another. Capacitance measurements may be taken where the intersections with the electrodes from the first set 204 and the second set 206 overlap. In some examples, a voltage may be applied to the transmit electrodes and the voltage of a sense electrode that overlaps with the transmit electrode may be measured. The voltage from the sense electrode may be used to determine the capacitance at the intersection where the sense electrode overlaps with the transmit electrode.

In the example of FIG. 3 depicting a cross section of a capacitance module, the substrate 202 may be located between a capacitance reference surface 212 and a shield 214. The capacitance reference surface 212 may be a covering that is placed over the first side of the substrate 202 and that is at least partially transparent to electric fields. As a user's finger or stylus approach the capacitance reference surface 212, the presence of the finger or the stylus may affect the electric fields on the substrate 202. With the presence of the finger or the stylus, the voltage measured from the sense electrode may be different than when the finger or the stylus are not present. As a result, the change in capacitance may be measured.

The shield 214 may be an electrically conductive layer that shields electric noise from the internal components of the electronic device. This shield may prevent influence on the electric fields on the substrate 202. In some cases, the shield is solid piece of material that is electrically conductive. In other cases, the shield has a substrate and an electrically conductive material disposed on at least one substrate. In yet other examples, the shield is layer in the touch pad that performs a function and also shields the electrodes from electrically interfering noise. For example, in some examples, a pixel layer in display applications may form images that are visible through the capacitance reference surface, but also shields the electrodes from the electrical noise.

The voltage applied to the transmit electrodes may be carried through an electrical connection 216 from the touch controller 208 to the appropriate set of electrodes. The voltage applied to the sense electrode through the electric fields generated from the transmit electrode may be detected through the electrical connection 218 from the sense electrodes to the touch controller 208.

While the example of FIG. 3 has been depicted as having both sets of electrodes deposited on a substrate, one set of electrodes deposited on a first side and a second set of electrodes deposited on a second side; in other examples, each set of electrodes may be deposited on its own dedicated substrate.

Further, while the examples above describe a touch pad with a first set of electrodes and a second set of electrodes; in some examples, the capacitance module has a single set of electrodes. In such an example, the electrodes of the sensor layer may function as both the transmit and the receive electrodes. In some cases, a voltage may be applied to an electrode for a duration of time, which changes the capacitance surrounding the electrode. At the conclusion of the duration of time, the application of the voltage is discontinued. Then a voltage may be measured from the same electrode to determine the capacitance. If there is no object (e.g., finger, stylus, etc.) on or in the proximity of the capacitance reference surface, then the measured voltage off of the electrode after the voltage is discontinued may be at a value that is consistent with a baseline capacitance. However, if an object is touching or in proximity to the capacitance reference surface, then the measured voltage may indicate a change in capacitance from the baseline capacitance.

In some examples, the capacitance module has a first set of electrodes and a second set of electrodes and is communication with a controller that is set up to run both mutual capacitance measurements (e.g., using both the first set and the second set of electrodes to take a capacitance measurement) or self-capacitance measurements (e.g., using just one set of electrodes to take a capacitance measurement).

Figure 4:
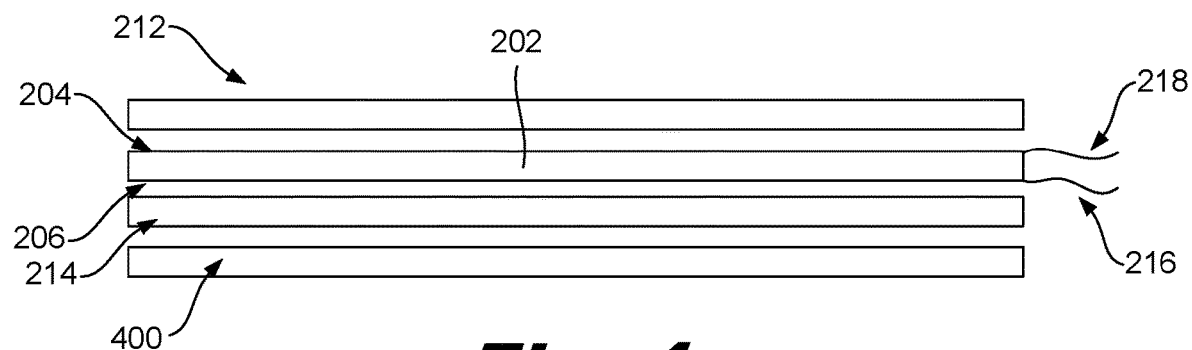
FIG. 4 depicts an example of a touch screen in accordance with the disclosure.

FIG. 4 depicts an example of a capacitance module incorporated into a touch screen. In this example, the substrate 202, sets of electrodes 204, 206, and electrical connections 216, 218 may be similar to the arrangement described in conjunction with FIG. 3. In the example of FIG. 4, the shield 214 is located between the substrate 202 and a display layer 400. The display layer 400 may be a layer of pixels or diodes that illuminate to generate an image. The display layer may be a liquid crystal display, a light emitting diode display, an organic light emitting diode display, an electroluminescent display, a quantum dot light emitting diode display, an incandescent filaments display, a vacuum florescent display, a cathode gas display, another type of display, or combinations thereof. In this example, the shield 214, the substrate 202, and the capacitance reference surface 212 may all be at least partially optically transparent to allow the image depicted in the display layer to be visible to the user through the capacitance reference surface 212. Such a touch screen may be included in a monitor, a display assembly, a laptop, a mobile phone, a mobile device, an electronic tablet, a dashboard, a display panel, an infotainment device, another type of electronic device, or combinations thereof.

Figure 5:
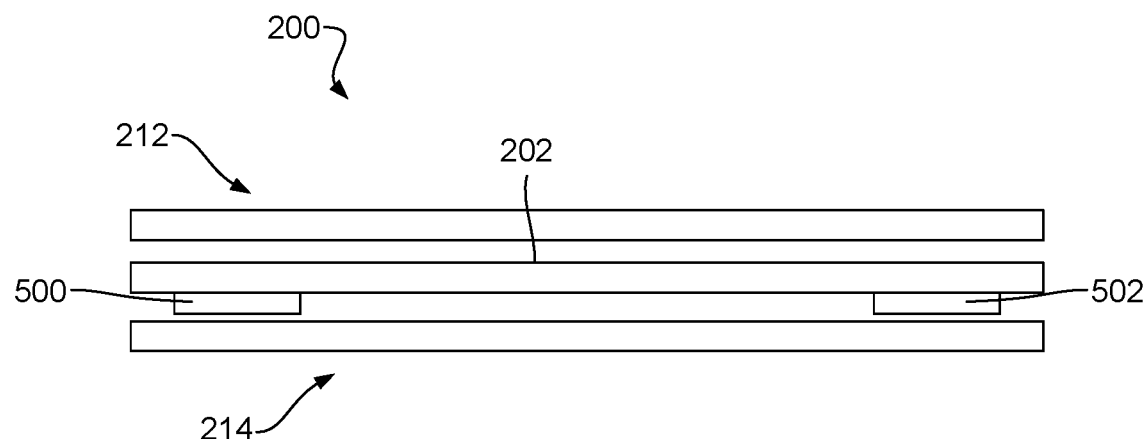
FIG. 5 depicts an example of an input surface in accordance with the disclosure.

FIG. 5 depicts an example of a cross section of a capacitance module 200 where the substrate 202 may be located between a capacitance reference surface 212 and a shield 214. In this example, a first pressure sensor 500 and a second pressure sensor 502 are incorporated into the capacitance module pad 200. As depicted in this example, the pressure sensors 500, 502 may be disposed adjacent to an underside of the substrate 202. But, in other examples, the pressure sensors may be positioned at any appropriate location, including, but not limited to, adjacent the underside of the capacitance reference surface 212, adjacent the underside of the shield, another location, or combinations thereof. In examples where the pressure sensors 500, 502 are positioned under the substrate 202, pressure applied to the capacitance reference surface 212 may be transmitted through the capacitance reference surface 212 exerting a pressure on the substrate 202, which in turn applies a pressure to at least one of the pressure sensors 500, 502. In examples where the pressure sensors are positioned adjacent to the shield, the pressure applied to input surface may be transmitted to the shield, which in turn applies the pressure to the pressure sensors. This pressure may be measured by the pressure sensors 500, 502 to determine the value of the pressure. In this example, the first pressure sensor 500 is spaced apart from the second pressure sensor 502 at a distance along a length, width, and/or another dimension of the capacitance reference surface 212, which may allow the first pressure sensor 500 and the second pressure 502 to detect different levels of pressure depending on the location where the pressure input is made on the capacitance reference surface 212. In some cases, those pressure sensors that are closer to the location where the pressure input is made can detect a greater pressure force than the pressure sensor that is located farther away. The differing pressure values may help determine where the pressure input is made.

While this example is depicted with a pressure sensor incorporated into a capacitance module with a capacitance sensor, in other examples, the pressure sensors are not incorporated with a capacitance sensor. Further, any appropriate type of pressure sensor may be used in accordance with the principles described herein. For example, a non-exhaustive list of suitable pressure sensors includes, but is not limited to, piezoelectric sensors, magnostrictive sensors, potentiometric pressure sensors, inductive pressure sensors, capacitive pressure sensors, strain gauge pressure sensors, variable reluctance pressure sensors, other types of pressure sensors, or combinations thereof.

In some examples, the pressure sensor may also include an ability to provide haptic feedback. For example, a piezoelectric device may be used as both a pressure sensor and as a haptic device. When the piezoelectric material is compressed due to the application of pressure through the capacitance reference surface, the piezoelectric material may produce an electric signal with can be detected by a controller. In some cases, the controller may produce an electric signal that is sent to the piezoelectric material to cause the piezoelectric material to expand, contract, and/or vibrate. The vibrations from the piezoelectric material may cause the capacitance reference surface to vibrate. This vibration may communicate a haptic signal to the user. However, in some examples, the pressure sensors are not configured to provide a haptic signal.

Figure 6:
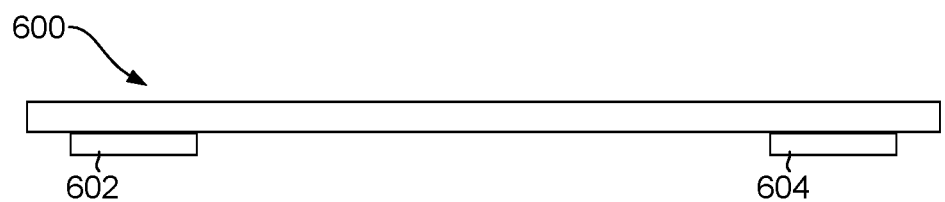
FIG. 6 depicts an example of an input surface in accordance with the disclosure.

FIG. 6 depicts an example of a reference surface 600. In this example, a first pressure sensor 602 and a second pressure sensor 604 are located adjacent to the reference surface 600. In this example, the first pressure sensor 602 and the second pressure sensor 604 are not incorporated into a stack having a capacitance sensor.

Figure 7:
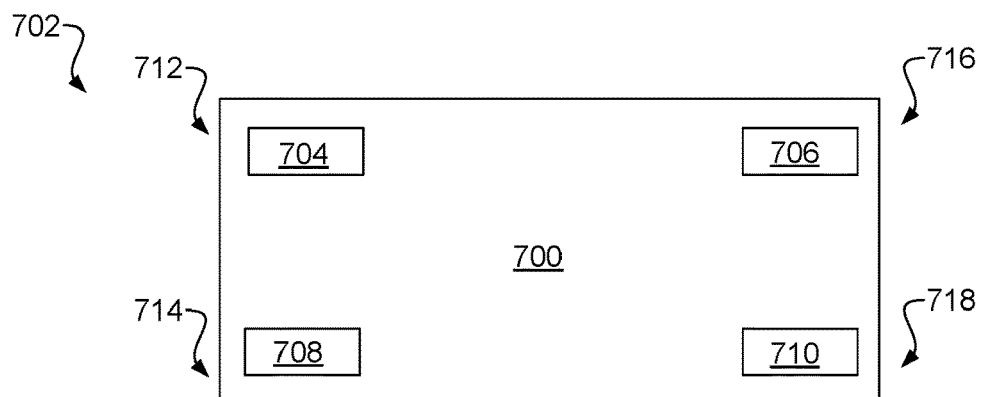
FIG. 7 depicts an example of an arrangement of pressure sensors in accordance with the disclosure.
Figure 8:
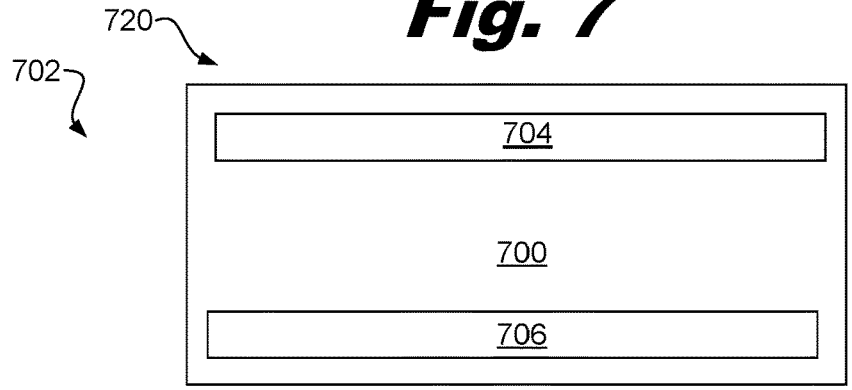
FIG. 8 depicts an example of an arrangement of pressure sensors in accordance with the disclosure.
Figure 9:
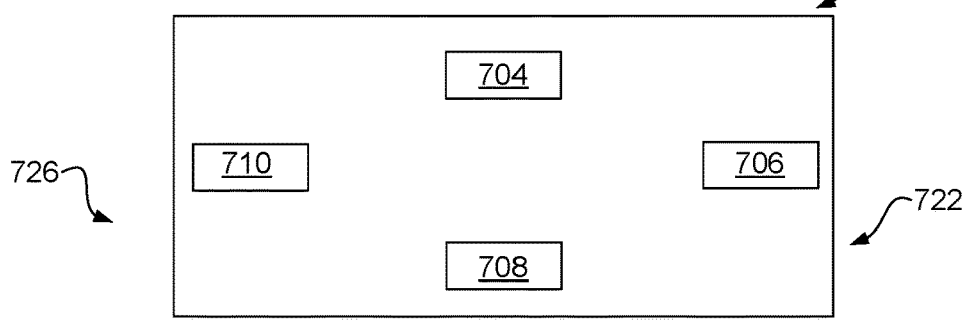
FIG. 9 depicts an example of an arrangement of pressure sensors in accordance with the disclosure.
Figure 10:
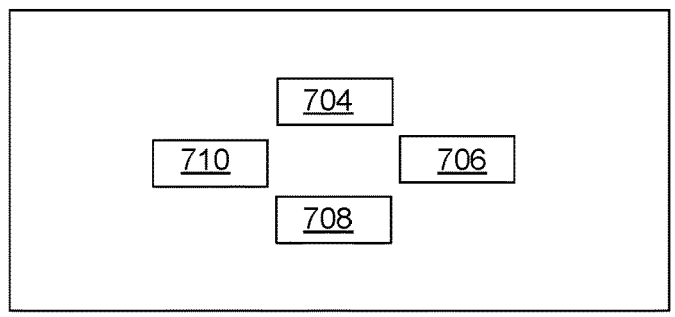
FIG. 10 depicts an example of an arrangement of pressure sensors in accordance with the disclosure.

FIGS. 7-10 depict examples of pressure sensors depicted on an underside 700 of a reference surface 702. In the example of FIG. 7, the reference surface 702 has a rectangular shape and pressure sensors 704, 706, 708, 710 are positioned in each of the corners 712, 714, 716, 718. In the example of FIG. 8, just a first pressure sensor 704 is depicted on a first side 720, and a second pressure sensor 706 is depicted on a second side 722 of the input surface 702. In the example of FIG. 9, the pressure sensors 704, 706, 708, 710 are depicted in the center of the first side 720, the second side 722, the third side 724, and the fourth side 726. In the examples of FIG. 10, the pressure sensors 704, 706, 708, 710 are depicted towards the center of the input surface and away from the edges and corners of the input surface 702.

While the examples in FIGS. 7-10 are described with reference to a specific number of pressure sensors, any appropriate number of pressure sensors may be disposed adjacent to the input surface. For example, the number of pressure sensors may include one pressure sensor or multiple pressure sensors. While the examples depicted above are described with reference to specific patterns and locations for the pressure sensors, other arrangements are contemplated including, but not limited to, symmetric distribution of sensors, an asymmetric distribution of sensors, other distributions and patterns of sensors, or combinations thereof.

Figure 11:
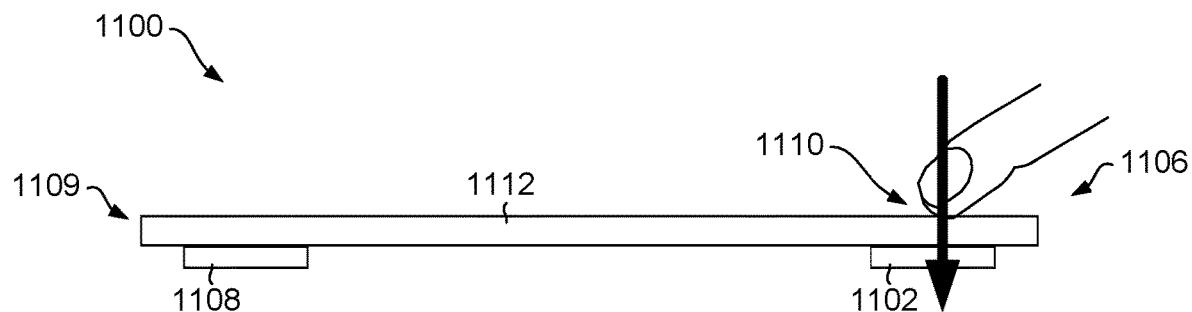
FIG. 11 depicts an example of making a user input in accordance with the disclosure.

FIG. 11 depicts an example of a capacitance module 1100 with a first pressure sensor 1102 on a first side 1106 of the capacitance module 1100 and a second pressure sensor 1108 on a second side 1109 of the capacitance module 1100. In this example, the user makes a user input by pressing on a first position 1110 on the surface 1112 of the capacitance module 1100. In the illustrated example, the first pressure sensor 1102 is immediately adjacent the first position 1110. In this example, the pressure from the user input may be concentrated towards the first pressure sensor 1102. This pressure may be directed to the first pressure sensor 1102 by traveling through the capacitance sensor.

In the example of FIG. 11, some of the pressure from the user input may be measurable at the second pressure sensor 1108. In some cases, the capacitance module 1100 may be stiff enough that most, if not all, of the pressure is felt at the second pressure sensor 1108. However, in other embodiments, only a portion of the pressure may be measurable at the second pressure sensor 1108 or in some cases, no pressure may be measurable at the second pressure sensor 1108. In some cases, the first pressure sensor 1102 may measure a greater pressure than the second pressure sensor 1108. For example, both the first and the second pressure sensor 1102, 1108 may measure pressure from the user input, but the first pressure sensor 1002 may measure more than the second pressure sensor 1108. In other examples, the second pressure sensor 1108 may not detect any pressure from the user input while the first pressure sensor 1102 detects the pressure from the user input.

The capacitance module 1100 may detect the position of the user input by using mutual capacitance, self-capacitance, and/or both. In some examples, the capacitance controller may determine how far away the first pressure sensor 1102, the second pressure sensor 1108, or combinations thereof are from the location of the user input on the input surface of the capacitance module. In this example, based on the distance from the first pressure sensor 1102, the second pressure sensor 1108, or both, the capacitance module may assign an actuation threshold value to the first location. In some embodiments, each location on the surface 1112 of the capacitance module 1100 may have a predetermined actuation threshold value pre-assigned and stored in a look-up table or stored in a different format. In other examples, the capacitance controller may determine in real time an appropriate actuation threshold value based on distance measurement determined when the user input is made.

Figure 12:
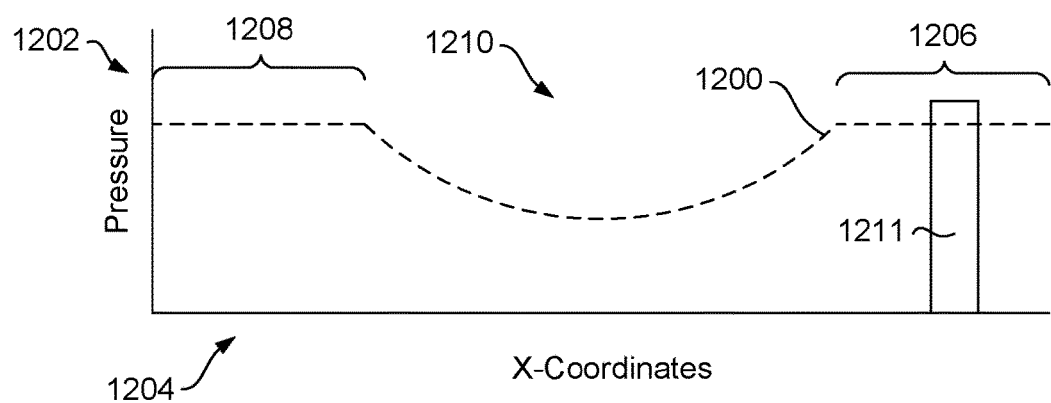
FIG. 12 depicts an example of a non-uniform threshold in accordance with the disclosure.

FIG. 12 depicts an example of an actuation threshold represented as a dashed line 1200. In this example, the pressure is represented by the y-axis 1202, and the x-coordinate position of the user input on the surface of the capacitance module is represented by the x-axis 1204. In this example, the actuation threshold 1200 may have a first region 1206 and a second region 1208 that have a uniform pressure. These regions 1206, 1208 of uniform pressure may correspond to areas on the capacitance module that are close to pressure sensors. Thus, a user input within these regions may have a consistent pressure to cross or exceed the actuation threshold 1200. In the depicted example, a pressure measurement 1211 from a user input is located in the first region 1206 with a pressure value that is sufficient to exceed the actuation threshold.

The actuation threshold 1200 may be non-uniform across the length and width of the surface of the capacitance module. In this example, the actuation value of the threshold progressively gets lower the farther away the locations get from the areas close to the pressure sensors. A user may apply the same pressure to region 1210 away from the pressure sensors; but, even though the pressure applied by the user in this region 1210 is the same as the pressure that would exceed the actuation threshold if the same pressure was applied in the first or second regions 1206, 1208, the pressure sensors may not actually measure the same pressure in region 1210. Reasons for measuring a different pressure in these regions even though the same pressure is applied may be attributed to flexing of the capacitance module in regions away from the pressure sensors, the direction of force of the user input, different thicknesses along the capacitance module, another reason, or combinations thereof.

In some cases, the non-uniform profile of the actuation threshold may be constructed so that the user may apply a consistent pressure in any region on the surface of the capacitance module and cross the actuation threshold even if the pressure sensors measure a lower pressure. In other examples, the non-uniform profile may be constructed so that the user has to apply different amounts of pressure on different regions to exceed the actuation threshold at different locations.

Figure 13:
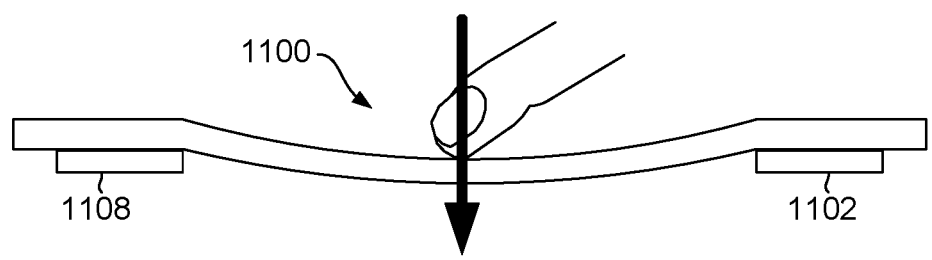
FIG. 13 depicts an example of making a user input in accordance with the disclosure.

FIG. 13 depicts an example where the user applies the same force as was applied in FIG. 11. In this example, the capacitance module 1100 flexes at the location where the user input is being made. The flexing of the capacitance module 1100 may cause the structure of the capacitance module to absorb at least some of the force from the user input resulting in a lower pressure measurement 1300 that can be made with the pressure sensors.

Figure 14:
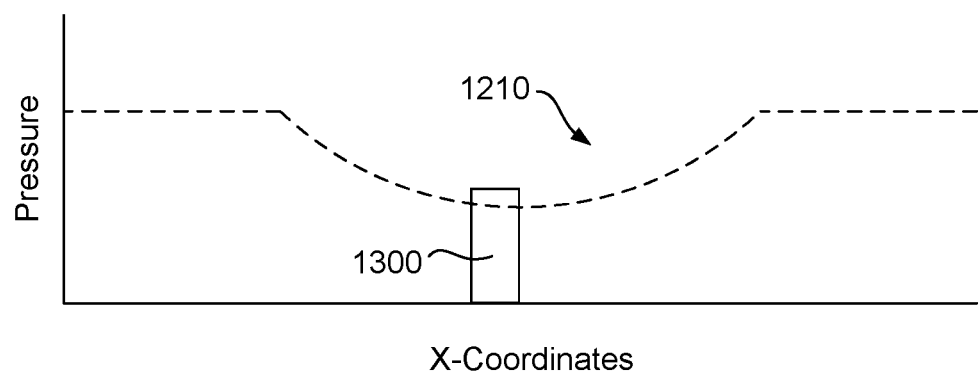
FIG. 14 depicts an example of a non-uniform threshold in accordance with the disclosure.

FIG. 14 depicts an example where the measured pressure value is less than the measured pressure value of FIG. 12, but the measured pressure value still exceeds the actuation threshold value at the user input's location depicted in FIG. 13.

Any appropriate actuation event may occur in response to exceeding the actuation threshold value at least at the location of the user input. For example, exceeding the actuation threshold value may trigger a command to cause a haptic response. In other applications, exceeding the actuation threshold value may result in turning on a light, sending a message, making an audio sound, changing a power setting, moving a cursor, changing a setting, actuating another response, or combinations thereof.

In some examples where the triggered actuation is a haptic response, the haptic actuators may be integrally incorporated into the pressure sensors, such as examples where a piezoelectric element can be used to both sense pressure and provide a haptic feedback. In other examples, an additional haptic device that is separate and distinct from the pressure sensors may be used.

While the examples of FIGS. 11-14 depict specific actuation threshold profiles, any appropriate actuation threshold value may be used in accordance with the principles described in the present disclosure. For example, FIGS. 12 and 14 depict regions that correspond to areas on the capacitance surface that had a uniform pressure value within those areas. However, in some examples, the actuation threshold profile may not have regions where the threshold values are uniform or consistent. Further, the actuation threshold profile in FIGS. 12 and 14 are depicted as being symmetric. However, in some examples, the actuation threshold profile may be asymmetric. For example, one pressure sensor may be calibrated to receive a greater pressure than another pressure sensor in mechanical communication with the same surface to exceed the actuation threshold value.

Figure 15:
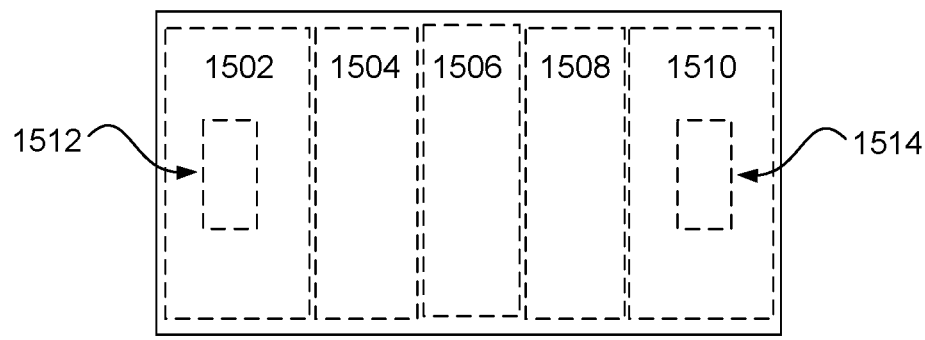
FIG. 15 depicts an example of a capacitance surface with regions having different threshold values in accordance with the disclosure.
Figure 16:
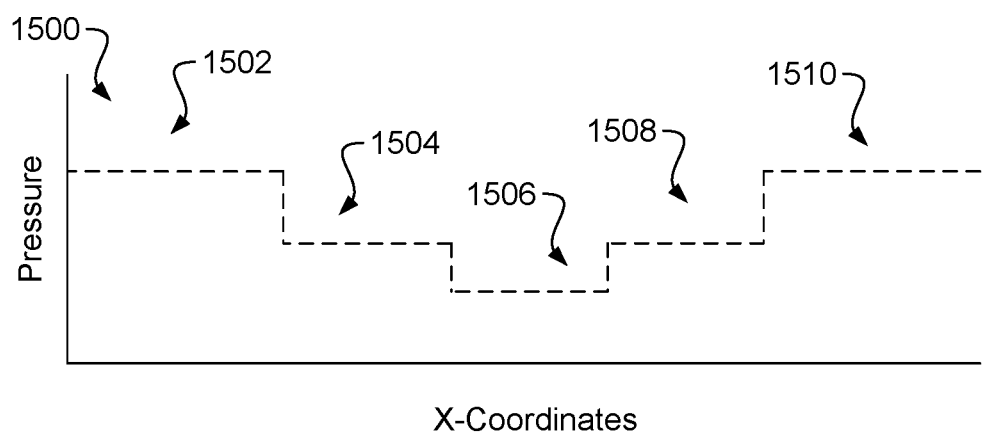
FIG. 16 depicts an example of a non-uniform threshold in accordance with the disclosure.

The examples of FIGS. 15 and 16 depict another example of an actuation threshold profile 1500. In this example, FIG. 15 depicts multiple regions 1502, 1504, 1506, 1508, 1510 on the surface of the capacitance module. Each of these predefined regions may be assigned a specific threshold value that reflects the distance each region is from the pressure sensors. The threshold values of each region may reflect the distance that each region is from the pressure sensors and/or the measurable pressure loss that may occur in these regions.

FIG. 16 depicts the threshold actuation profile in this example. Region 1506; being the farthest away from the pressure sensors 1512, 1514; has the lowest actuation threshold value. Regions 1504, 1508 have a higher actuation threshold value than region 1506, but lower values than regions 1502, 1510.

Figure 17:
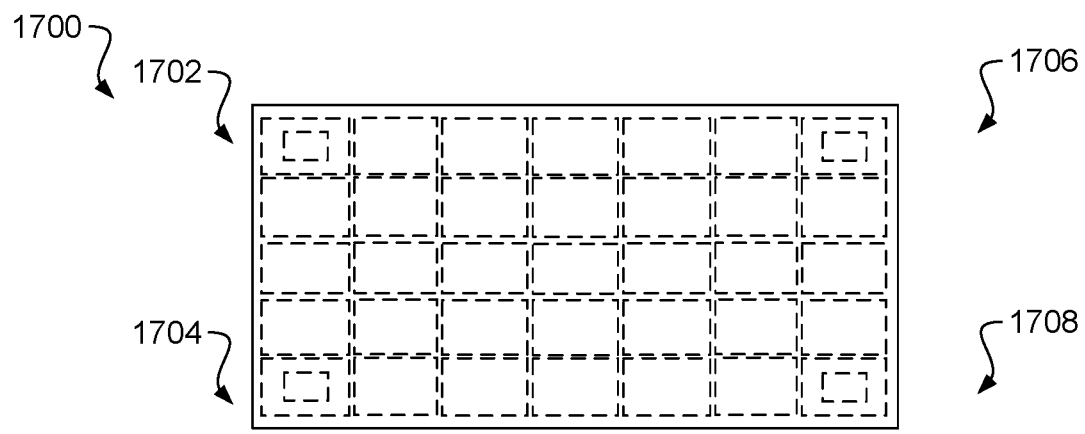
FIG. 17 depicts an example of a capacitance surface with regions having different threshold values in accordance with the disclosure.

FIG. 17 depicts another example of a capacitance module 1700 with multiple regions that are independently assigned a different actuation threshold value. In this example, the different regions may be assigned different actuation threshold values based, at least in part, on their distances from a pressure sensor 1702, 1704, 1706, 1708. However, the non-uniform profile of the actuation threshold profile may be constructed to account for any appropriate parameter. Such parameters may include, but are not limited to, a distance from the pressure sensors, a flexibility of the capacitance sensor, a structural difference in the capacitance module, an angle of a pressure sensor, a contact between the capacitance module and another structure, a mechanical connection to the capacitance module, different sensitivities of a pressure sensor, a different concentration of pressure sensors in some areas of the capacitance module, different power levels of the pressure sensors, different materials of the pressure sensors, different materials of the capacitance sensors, different stiffnesses of the capacitance sensor, other factors, or combinations thereof.

Figure 18:
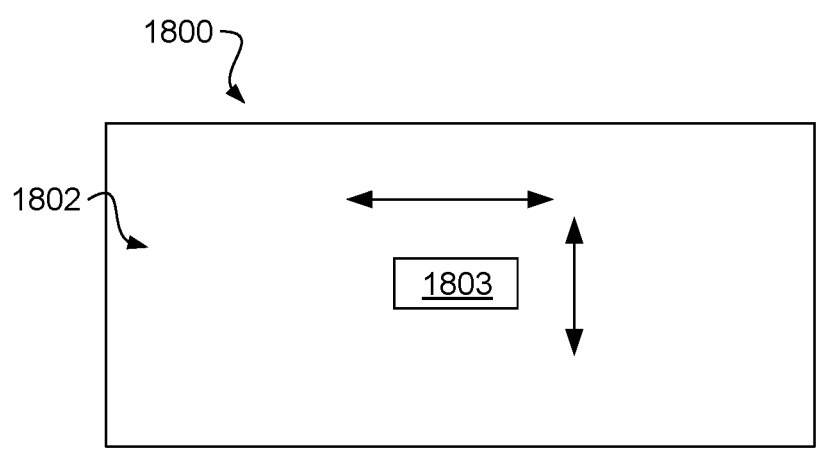
FIG. 18 depicts an example of a capacitance module in accordance with the disclosure.

FIG. 18 depicts an example of a capacitance module 1800. In this example, the capacitance module 1800 includes a capacitance sensor surface 1802 and a single pressure sensor 1803 attached to a back side of the pressure sensor 1803. The back side is opposite the surface 1802 of the capacitance sensor. In this example, the pressure sensor 1803 may measure most, if not all, of the pressures made by user inputs anywhere on the surface 1802. In such an example, the capacitance sensor may determine the location of each user input. The controller may determine the actuation threshold value for each input by taking into account the distance from the along the x and y directions.

Figure 19:
FIG. 19 depicts an example of a capacitance module in accordance with the disclosure.

FIG. 19 depicts an example where the capacitance module 1900 is suspended from a structure 1902. In some examples, the structure may be a keyboard housing, a laptop housing, a mobile phone housing, a display housing, another type of housing, a frame, another type of structure, or combinations thereof. In this example, the pressure sensor 1904 may be incorporated into the suspension structure 1906. In some examples where the pressure sensor is incorporated into a suspension structure, the pressure sensor may be a strain gauge or another type of sensor that measures pressure based on a measured tension.

Figure 20:
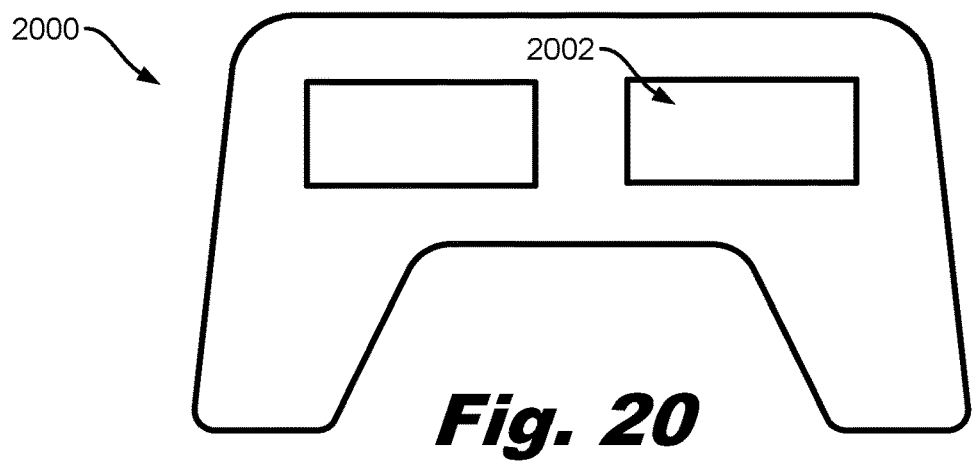
FIG. 20 depicts an example of a gaming controller in accordance with the disclosure.

FIG. 20 depicts an example of a gaming controller 2000. In some examples, the surface on which the user may apply the pressure to the capacitance sensor may be a button surface 2002, such as that depicted in FIG. 20.

Figure 21:
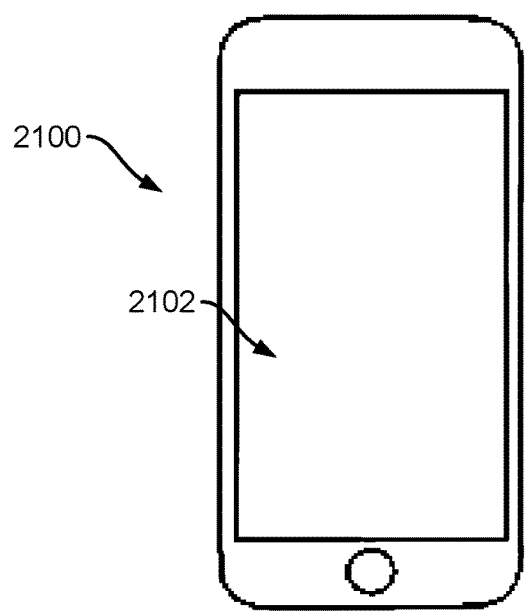
FIG. 21 depicts an example of a touch screen in accordance with the disclosure.

FIG. 21 depicts an example of a touch screen 2100 incorporated into a mobile device 2102. The touch screen 2100 may be the surface on which a user may apply the pressure. The capacitance sensor may reside under the touch screen and receive the pressure through the touch screen. This pressure may further be pushed into the pressure sensor, which may reside below the capacitance sensor.

Figure 22:
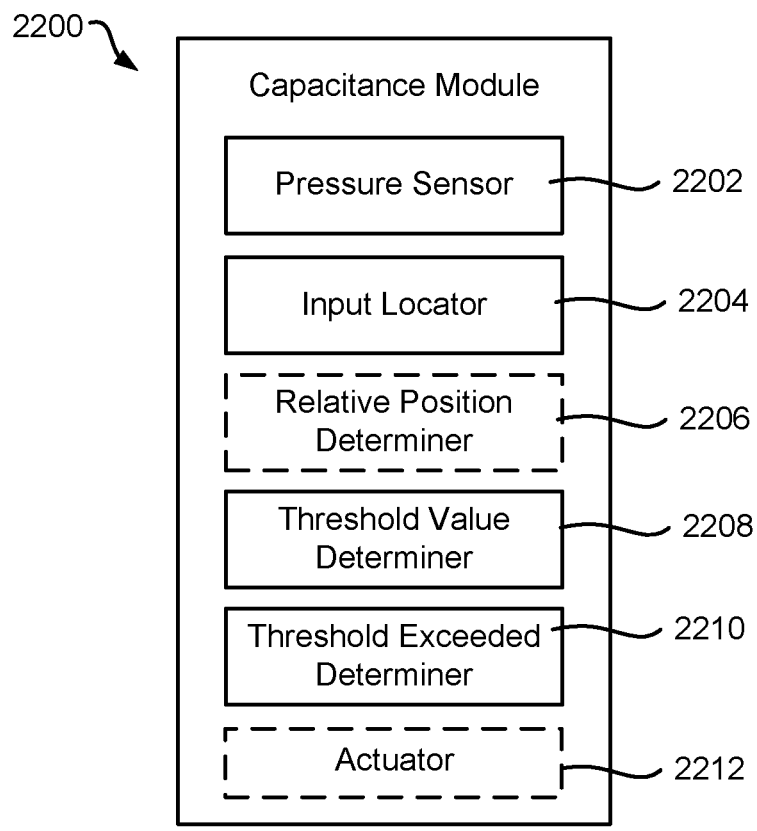
FIG. 22 depicts an example of a capacitance module in accordance with the disclosure.

FIG. 22 depicts an example of a capacitance module 2200. In this example, the capacitance module 2200 includes programmed instructions in memory and may include associated firmware, logic, processing resources, memory resources, power sources, hardware, or other types of hardware to carry out the tasks of the capacitance module 2200. The capacitance module 2200 may be used in conjunction with the description of the devices, modules, and principles described in relation to FIGS. 1-21 and 23-24. In this example, the capacitance module 2200 includes a pressure sensor 2202, an input locator 2204, a relative position determiner 2206 (optional), a threshold value determiner 2208, and a threshold exceeded determiner 2210. In some cases, the capacitance module 2200 optionally includes an actuator 2212.

The pressure sensor 2202 may sense a pressure that is applied to the input surface. In some cases, a single pressure sensor 2202 may be used to sense multiple pressures applied to the input surface. In other examples, multiple pressure sensors 2202 may be positioned to sense the pressure loads applied to the input surface. In some cases, the pressure sensor 2202 may also determine the value of the pressure applied to the input surface.

The input locator 2204 may sense the location of the user input. For example, input locator 2204 of the capacitance module may include at least one electrode that can be used as part of mutual capacitance hardware or self-capacitance hardware to measure capacitance changes. In some examples, a measurement with the capacitance sensor that includes the electrode may indicate the presence of a user's finger or another object at a particular location that may be correlated as the location of the user input.

The capacitance module 2200 may optionally include the relative position determiner 2206 that may determine the position of the user input with respect to the pressure sensor. In some cases, the module may determine how far away the user input's location is with respect to one or more of the pressure sensors. The distance from at least one or more sensors may be used as an input to be used by the threshold exceeder determiner 2210.

The threshold value determiner 2208 may determine the threshold value correlated with the location of the user input. In some examples, the threshold value determiner 2208 may receive data from another component of the capacitance module 2200, such as for example a distance from a pressure sensor. In other examples, the threshold value determiner 2208 may consult with a look-up table that associates different regions of the capacitance sensor with a threshold value.

The threshold exceeder determiner 2210 may determine whether the pressure measured with pressure sensor exceeds the threshold value at the specific user location. In some examples, a pressure value at one position on the capacitance sensor will exceed the threshold value while the same pressure value at other locations on the capacitance sensor will not exceed the threshold value.

The actuator 2212 may trigger an action or event to occur based, at least in part, on a pressure value exceeding the threshold value. For example, in some cases when the measured pressure value exceeds the threshold value at a particular location, a haptic response may be generated. In some cases, the haptic feedback system may be incorporated into the capacitance module. While some examples include applying a haptic response to the user input location, in other examples, a different (or an additional) action may be triggered when the measured pressure exceeds the actuation threshold value. For example, the triggered action may include, but is not limited to, a haptic response, an audio response, a visual displayed response, illumination of a light, movement of a cursor, opening of an application, another type of action, or combinations thereof.

Figure 23:
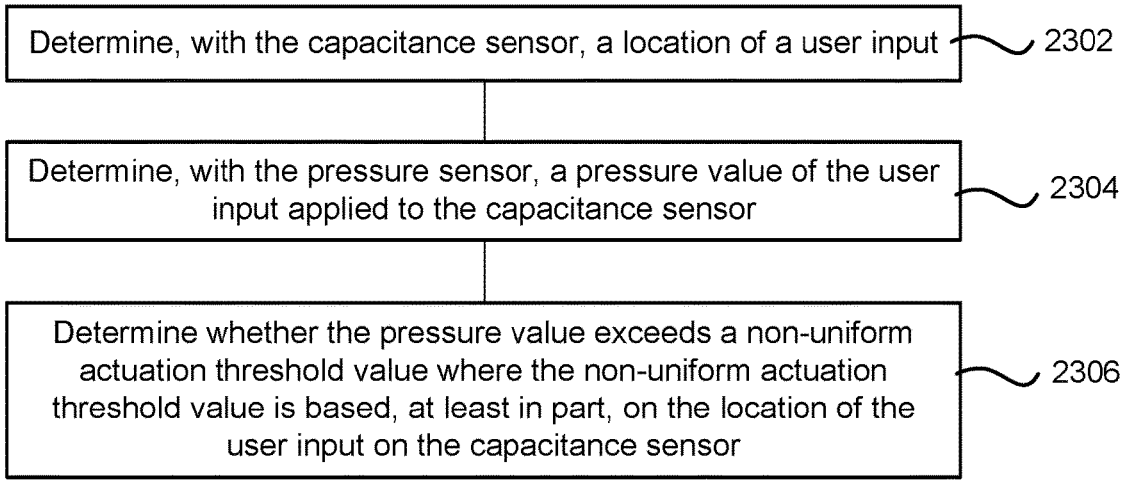
FIG. 23 depicts an example of a method of using a capacitance module in accordance with the disclosure.

FIG. 23 depicts an example of a method 2300 of using a capacitance module. This method 2300 may be performed based on the description of the devices, modules, and principles described in relation to FIGS. 1-22. In this example, the method 2300 includes determining 2302, with the capacitance sensor, a location of a user input; determining 2304, with the pressure sensor, a pressure value of the user input applied to the capacitance sensor; and determining 2306, with the pressure sensor, a pressure value of the user input applied to the capacitance sensor.

Figure 24:
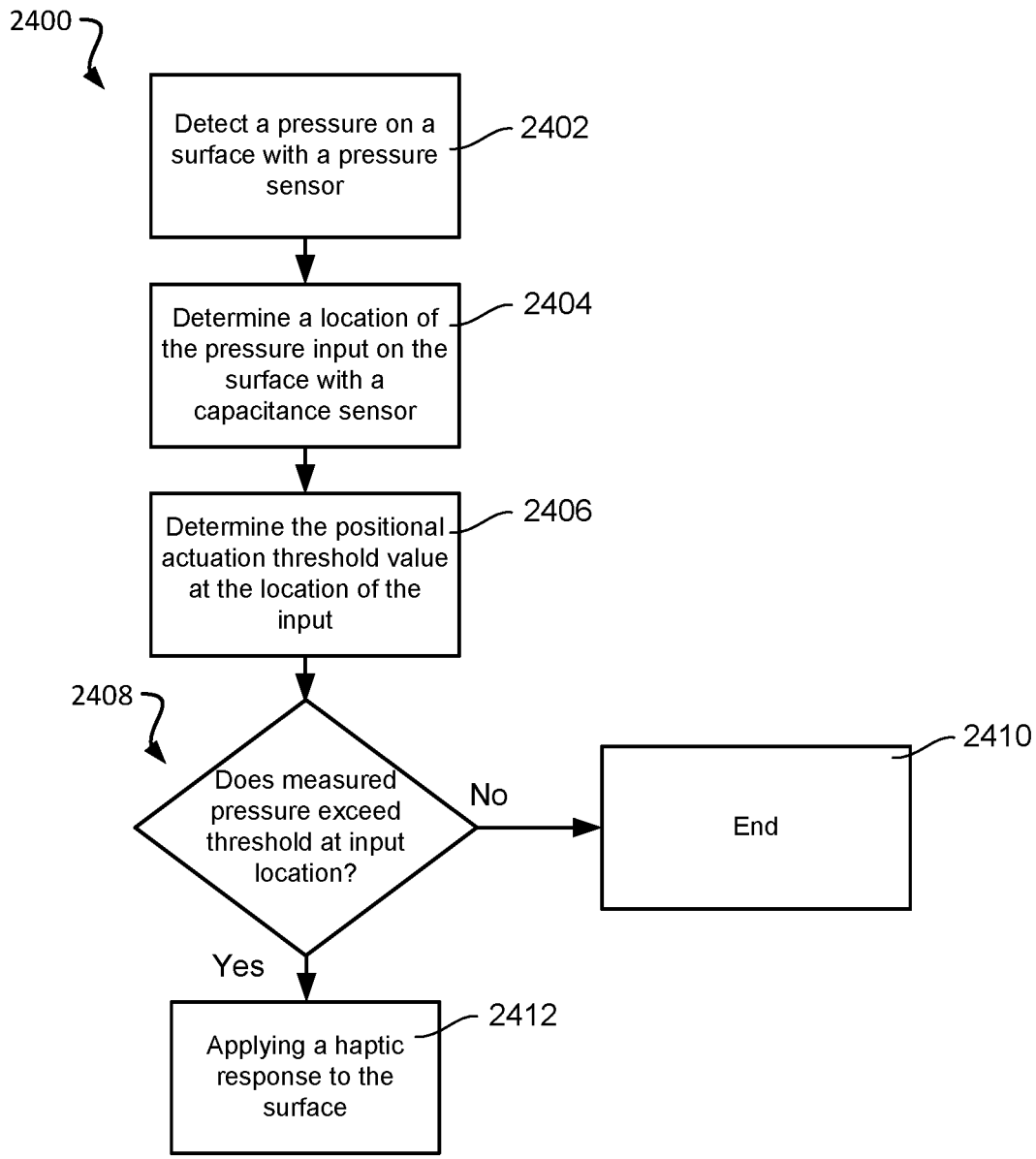
FIG. 24 depicts an example of a method of using a capacitance module in accordance with the disclosure.

FIG. 24 depicts an example of a method 2400 of using a capacitance module. This method 2400 may be performed based on the description of the devices, modules, and principles described in relation to FIGS. 1-22. In this example, the method 2400 includes detecting 2402 a pressure on a surface with a pressure sensor; determining 2404 a location of the pressure input on the surface with a capacitance sensor; and determining 2406 the positional actuation threshold value at the location of the input. The method 2400 also includes determining 2408 if the measured pressure exceeds the threshold at the input location. If the measured pressure does not exceed the threshold, then the procedure ends 2410. On the other hand, if the measured pressure does exceed the threshold, then the method 2412 includes applying 2412 a haptic response to the surface.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. A capacitance sensing module, comprising:
a capacitance sensor;
a first pressure sensor in mechanical communication with the capacitance sensor;
a second pressure sensor in mechanical communication with the capacitance sensor;
a processor and memory;
programmed instructions stored in the memory to cause the processor, when executed, to:
determine, with the capacitance sensor, a location of a user input;
determine, with the first pressure sensor, a pressure value of the user input applied to the capacitance sensor; and
determine whether the pressure value exceeds a non-uniform actuation threshold value;
wherein the non-uniform actuation threshold value is based, at least in part, on the location of the user input on the capacitance sensor;
wherein the non-uniform actuation threshold value of the user input is based, at least in part, on a first distance between the user input and the first pressure sensor; and
wherein the non-uniform actuation threshold value of the user input is also based, at least in part, on a second distance between the user input and the second pressure sensor.

2. The capacitance sensing module of claim 1, wherein the programmed instructions cause the processor, when executed, to trigger a haptic response when the non-uniform actuation threshold is exceeded.

3. The capacitance sensing module of claim 1, wherein each of the first pressure sensor and the second pressure sensor is a piezoelectric device.

4. The capacitance sensing module of claim 3, wherein the piezoelectric device is configured to apply haptic response to the capacitance sensor in response to the user input exceeding the non-uniform actuation threshold value.

5. The capacitance sensing module of claim 1, wherein the programmed instructions cause the processor, when executed to:
assign a first region of the capacitance sensor a first specific actuation threshold value;
assign a second region of the capacitance sensor a second specific actuation threshold value where the second region is farther away from each of the first pressure sensor and the second pressure sensor than the first region;
wherein the first specific actuation threshold value is higher than the second specific actuation threshold value.

6. The capacitance sensing module of claim 1, wherein the non-uniform actuation threshold value gets progressively lower as the user input is farther away from each of the first pressure sensor and the second pressure sensor.

7. The capacitance sensing module of claim 1, wherein the first pressure sensor and the second pressure sensor are part of a plurality of is one of pressure sensors and at least one pressure sensor of the plurality of pressure sensors is located in each corner of the capacitance sensor;
wherein the non-uniform actuation threshold value of the user input is based, at least in part, on distances of each pressure sensor of the plurality of pressure sensors located in each corner.

8. A computing device, comprising:
a capacitance reference surface;
a capacitance sensor in mechanical communication with the capacitance reference surface;
a first pressure sensor in mechanical communication with the capacitance sensor;
a second pressure sensor in mechanical communication with the capacitance sensor;
a processor and memory;
programmed instructions stored in the memory to cause the processor, when executed, to:
determine, with the capacitance sensor, a location of a user input;

determine, with the first pressure sensor, a pressure value of the user input applied to the capacitance sensor; and determine whether the pressure value exceeds a non-uniform actuation threshold value;

wherein the non-uniform actuation threshold value is based, at least in part, on the location of the user input on the capacitance sensor;

wherein the non-uniform actuation threshold value of the user input is based, at least in part, on a first distance between the user input and the first pressure sensor; and wherein the non-uniform actuation threshold value of the user input is also based, at least in part, on a second distance between the user input and the second pressure sensor.

9. The computing device of claim 8, wherein the capacitance reference surface is part of a laptop housing.

10. The computing device of claim 8, wherein the capacitance reference surface is a touchpad overlay.

11. The computing device of claim 8, wherein the capacitance reference surface is a touch screen.

12. The computing device of claim 8, wherein the capacitance reference surface is a control button.

13. The computing device of claim 8, wherein the programmed instructions cause the processor, when executed, to trigger a haptic response when the non-uniform actuation threshold is exceeded.

14. The computing device of claim 8, wherein the non-uniform actuation threshold value gets progressively lower as the user input is farther away from each of the first pressure sensor and the second pressure sensor.

15. The computing device of claim 8, wherein each of the first pressure sensor and the second pressure sensor is a piezoelectric device; and wherein the piezoelectric device is configured to apply a haptic response to the capacitance sensor in response to the user input exceeding the non-uniform actuation threshold value.

16. The computing device of claim 8, wherein the programmed instructions cause the processor, when executed to:

assign a first region of the capacitance sensor a first specific actuation threshold value;

assign a second region of the capacitance sensor a second specific actuation threshold value where the second region is farther away from each of the first pressure sensor and the second pressure sensor than the first region;

wherein the first specific actuation threshold value is higher than the second specific actuation threshold value.

17. The computing device of claim 8, wherein the first pressure sensor and the second pressure sensor are part of a plurality of pressure sensors and at least one pressure sensor of the plurality of pressure sensors is located in each corner of the capacitance sensor;

wherein the non-uniform actuation threshold value of the user input is based, at least in part, on distances of each pressure sensor of the plurality of pressure sensors located in each corner.

18. A computer-program product of using a capacitance sensor module, the computer-program product comprising a non-transitory computer-readable medium storing instructions executable by a processor to:

determine, with a capacitance sensor, a location of a user input on a capacitance reference surface in mechanical communication with the capacitance sensor;

determine, with a first pressure sensor in communication with the capacitance sensor, a pressure value of the user input applied to the capacitance sensor; and determine whether the pressure value exceeds a non-uniform actuation threshold value;

wherein the non-uniform actuation threshold value is based, at least in part, on the location of the user input on the capacitance sensor;

wherein the non-uniform actuation threshold value of the user input is based, at least in part, on a first distance between the user input and the first pressure sensor; and wherein the non-uniform actuation threshold value of the user input is also based, at least in part, on a second distance between the user input and a second pressure sensor, the second pressure sensor is in mechanical communication with the capacitance sensor.

* * * * *